United States Patent [19]

Nguyen

[11] 4,160,730
[45] Jul. 10, 1979

[54] PROCESS FOR MERCURY REMOVAL

[75] Inventor: Xuan T. Nguyen, Montreal, Canada

[73] Assignee: Domtar Inc., Montreal, Canada

[21] Appl. No.: 826,524

[22] Filed: Aug. 22, 1977

[51] Int. Cl.² ............................ C22B 43/00; C02B 1/36
[52] U.S. Cl. ........................................ 210/48; 210/50;
75/108; 75/121; 423/101; 423/107
[58] Field of Search ................... 210/50, 45, 48, 62;
75/108, 121; 423/99, 101, 103, 107, 109

[56] References Cited

U.S. PATENT DOCUMENTS

| | | | |
|---|---|---|---|
| 3,764,496 | 10/1973 | Hultman et al. | 204/99 |
| 3,764,528 | 10/1973 | Cadmus | 210/50 |
| 3,847,598 | 11/1974 | Coulter et al. | 210/50 X |
| 4,028,236 | 6/1977 | Townsend et al. | 210/50 X |

OTHER PUBLICATIONS

Analytical Method CAS-AM-70.13, Dow Chemical Co., Midland, MI, Jun. 22, 1970.

*Primary Examiner*—Thomas G. Wyse
*Attorney, Agent, or Firm*—C. A. Rowley

[57] ABSTRACT

A process for the removal of mercury from aqueous media containing mercury and undissolved solids comprises, adding hypochlorite to the aqueous medium, reducing the ionic mercury to elemental mercury, aerating the aqueous medium with a gas to entrain the mercury and separating the mercury from the entraining gas.

7 Claims, 1 Drawing Figure

PROCESS FOR MERCURY REMOVAL

BACKGROUND OF THE INVENTION/PRIOR ART

The present invention relates to a process for removal and recovery of mercury from aqueous media which contain mercury and undissolved solids. More particularly, the present invention relates to a process for the removal and recovery of mercury from chloralkali plant effluent.

Efforts are being made to prevent the loss of mercury to the environment. Some of the mercury lost to the waterways originates in the form of plant effluent, such as the liquid employed in scrubbing stack gases or effluent from chloralkali plants employing electrolytic cells with mercury cathodes.

One of the schemes proposed to eliminate these losses of mercury in aqueous media comprises reducing ionic mercury contained therein to elemental mercury, aerating the medium with an inert gas which entrains the mercury, followed by recovering the mercury from the gas by scrubbing it with a chlorinated brine solution. Such a procedure is not entirely satisfactory as it generally fails to remove effectively the mercury which is present in the medium. The elemental mercury present in the medium prior to the addition of the reductant, tends to coalesce into larger particles which are not very susceptible to vaporization. Even the agitation of the aqueous medium by the aerating gas and the consequent fragmentation of the agglomerated mercury fails to adequately improve the evaporation rate of the mercury. In addition, typical effluents contain undissolved solids on which the mercury, both elemental and ionic tends to adsorb or with which it might somehow associate itself, further impeding its vaporization and entrainment by the aerating gas.

A laboratory procedure for quantitative assay of mercury comprises boiling the sample with excess strong oxidant such as aqua regia for complete digestion of the elemental mercury, followed by reduction of the ionic mercury and aeration of the medium for mercury detection in the gas phase.

It is the object of the invention to provide an improved process for the removal and recovery of mercury contained in aqueous media.

BRIEF DESCRIPTION OF THE INVENTION

The present invention provides a process for the removal of mercury from an aqueous medium containing mercury and undissolved solids, comprising the steps of treating said medium with hypochlorite in a molar amount which comprises at least 20 times the molar amount of said mercury in said medium, adding a reducing agent to said hypochlorite treated medium to convert substantially all ionic mercury in said medium to elemental mercury, passing an entraining gas through said medium to entrain said elemental mercury, and separating said vaporized mercury from said gas.

The single FIGURE of the drawings is a schematic representation of the sequence of steps of an embodiment of the present process integrated into a chloralkali operation.

DETAILED DESCRIPTION OF THE INVENTION

Figure 1:
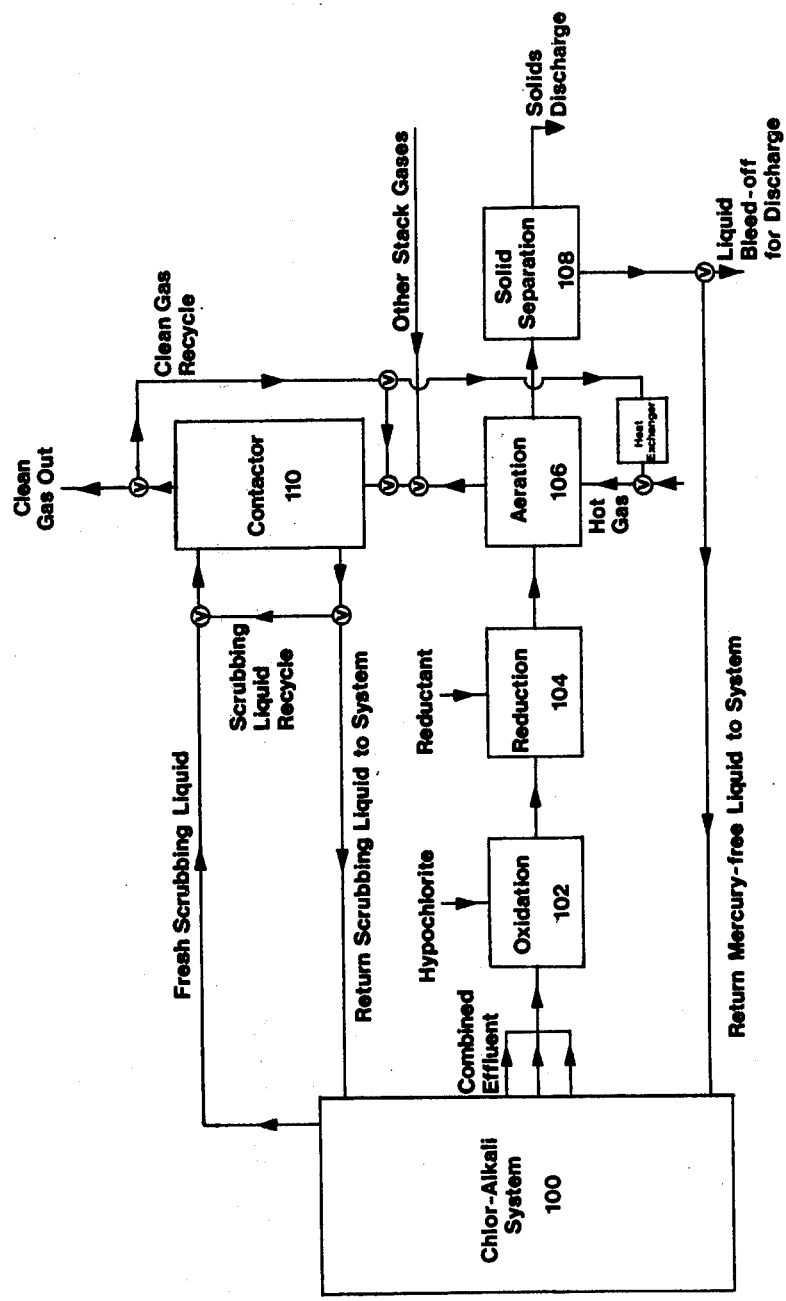

A necessary step of the process of the present invention comprises adding hypochlorite to the mercury-containing aqueous medium to convert any non-ionic mercury in the medium to ionic mercury and to dissociate any mercury from the undissolved solids with which it may somehow be associated. This may be carried out at ambient temperature. The hypochlorite added is preferably sodium hypochlorite, but calcium hypochlorite or hypochlorites of other alkali or alkali earth metals may be used. The hypochlorite ion may alternatively be produced in situ by the reaction of chlorine gas and the respective hydroxide in the aqueous medium. The quantity of hypochlorite added to the medium must be sufficient to ensure the complete oxidation of the elemental mercury that may be present. Additionally some hypochlorite will be needed to dissociate the undissolved solids from the associated mercury. Such an amount is normally at least 20 times the estimated molar concentration of mercury (elemental and ionic) in the aqueous medium. Combining all the aqueous effluent from a chloralkali plant would normally result in a mercury level about 10 ppm (which corresponds to a concentration of $0.5 \times 10^{-4}$ moles/liter), hence about 100 ppm (i.e. $13.4 \times 10^{-4}$ moles/liter) of hypochlorite would be used. For an adequate oxidation of the non-ionic mercury to take place, a certain residence time is normally required. At ambient temperature, at least $\frac{1}{2}$ hour is normally required, with time periods of about 3–6 hours being preferred.

The oxidized mercury, which is believed to be dispersed throughout the aqueous medium in predominantly ionic form, is then reduced to elemental mercury by the addition of reducing agent (such as are taught in Canadian Pat. No. 993,174 issued July 20, 1976, to Allied Chemical, assignee of J. Guptill et al) which may be sodium borohydride, sodium sulfite, stannous chloride dihydrate, hydroxylamine hydrochloride, sodium thiosulfate, triethanolamine, hydrazine, hydroquinone, ascorbic acid, sucrose or D-glucose; or a combination of the preceding.

The preferred reducing chemical (in a non-acidic environment) is sodium borohydride, the dosage of which is normally at least about 10 times the stoichiometric proportion i.e. in the combined effluent of a chloralkali plant, of the type mentioned earlier, a minimum of about 5 ppm (which corresponds to $1.7 \times 10^{-3}$ moles/liter) of sodium borohydride would be required. Since, however, the reductant is first consumed by the excess hypochlorite from the preceding step, the actual dosage is much greater and may range up to about 500 ppm.

In order to prevent much coalescence of the mercury, the passage of an entraining gas through the medium is commenced immediately after the reduction step. This gas may be nitrogen, oxygen, or air, (air partially freed of carbon dioxide may be used if the aqueous medium contains substantial quantities of caustic soda or caustic potash). The gas is preferably at a temperature above the ambient and may be thus obtained by passing it through a heater, heat exchange unit or by introducing steam into the gas. The aerating gas is preferably at a temperature greater than 30° C.

The mercury thus entrained may be separated from the gas by scrubbing the gas with chlorine containing brine, which is preferably acidified or by dry absorption on a bed of absorber such as activated carbon or the like. The former technique, namely, using the chlorine containing brine is more appropriate for chloralkali plants where chlorine and brine are both readily available and the "spent" scrubbing liquid may be combined with the brine solution which is returned to the electrolytic cells where the mercury in the brine solution is plated out on the mercury cathode.

One of the advantages accruing from this process is the removal of mercury from the sludge (or other aqueous media) which would otherwise have been lost to the environment or carted away and stored indefinitely. In the case of a chloralkali system, the various mercury-containing effluents may be combined and treated simultaneously, as this technique is effective in the presence of undissolved solids, and the gas stream bearing mercury may be combined with the other stack gases for simultaneous removal of the mercury. Furthermore, the scrubbing liquid may be combined with the rest of the brine solution and recycled to the electrolytic cells for a restoration of the mercury to the cathode, whence it was lost.

The preferred embodiment of the present invention illustrated schematically in the single FIGURE shows the present invention integrated with a chloralkali operation, 100, in the diagram. The combined effluent from 100 passes through the oxidation stage 102, followed by reduction 104, following which hot gas is passed through the treated effluent in the aeration stage 106. The mercury-containing gases issuing from the aeration stage 106 are contacted with the scrubbing liquid in contactor 110, while the liquid effluent from 106 proceeds to the solid separation stage 108. The separated solids from 108 may be discharged along with a portion of the treated effluent, which the rest of the effluent may be recycled to the chloralkali system 100, possibly for reuse. A portion of the scrubbing liquid in the contactor 110 may be bled off and returned to the electrolysis section of the chloralkali plant 100 for the removal of mercury contained therein.

As illustrated in the drawing, the various effluents from the chloralkali plant 100 are combined and proceed to the oxidation stage 102 where hypochlorite is added to the combined effluent. The residence time of the effluent in this stage (102) is preferably about 3-6 hours to permit the oxidation to take place. The next step is the reduction, (104) the length of which will depend on the reductant used. Immediately following the reduction, the effluent is aerated (106) with a hot gas. Preferably, the aeration is carried out in a turbulent gas-liquid contactor, which enhances the transfer of mercury from the liquid to the gas phase. The hot gas is preferably air which has been heated eg. with low pressure steam. After aeration, the residual liquid is filtered or decanted, (108) the solids discharged in the form of a filter cake or thick sludge; while a portion of the liquid is recycled to the chloralkali system (100) and the remainder is bled off and discharged. The hot gas containing mercury may be combined with other stack gases which contain mercury, and contacted with acidified brine containing chlorine to strip off a portion of its mercury content in a contactor (110) which may be a packed tower or fluidized bed or a turbulent contact absorber. Some of the scrubbed gas may be vented while a portion may be recirculated through the scrubber and another portion may be added to the incoming hot gas for aeration of the effluent. A portion of the scrubbing liquid containing mercury is bled off and returned to the electrolytic cells where the mercury is plated out on the cathode. Fresh scrubbing liquid is added as make-up to the remainder of the scrubbing liquid containing mercury and this mixture circulated through the scrubber.

The examples below are intended to provide an illustration of specific embodiments of the present invention, and should not be construed as limiting it in any way.

EXAMPLE I

Three 200 ml. samples of brine sludge from a chloralkali plant, having a solids content of 12.7% and a mercury content which had been previously measured, were treated for comparison, according to a prior art technique and in accordance with the present invention. The sample of run 1 was treated according to a prior art technique which comprised adding a reducing agent (sodium borohydride in this case) to the sample, followed by aerating the sample. Runs 2 and 3 were carried out in accordance with the process of the present invention which additionally comprised adding sodium hypochlorite to the sample followed by a retention time of about 8-12 hours, adding sodium borohydride to the sample and aerating the sample after the addition of the reducing agent.

The concentration of the mercury in the treated sludge was measured at the end of the aeration, and the stripping efficiency of this procedure, defined as the percent decrease of the mercury content in the sludge due this treatment, was obtained.

The experimental conditions are summarized in Table I below.

TABLE I

| Exp. Run Number | 1 | 2 | 3 |
|---|---|---|---|
| Total solids (%) | 12.7 | 12.7 | 12.7 |
| Hypochlorite Dosage (as ppm Cl$_2$) | 0 | 800 | 1600 |
| Sodium Borohydride dosage (ppm) | 250 | 250 | 300 |
| Temp. of Stripping gas (°C.) | 57 | 54 | 57 |
| Stripping Time (min.) | 20 | 16 | 22 |
| Total mercury concentration in untreated sludge (ppm) | 15.98 | 16.32 | 16.12 |
| Residual mercury concentration in treated sludge (ppm) | 8.02 | 6.66 | 5.77 |
| Stripping Efficiency (%) | 49.8 | 59.2 | 64.2 |

EXAMPLE II

This example illustrates the pilot plant scale application of the present invention in the treatment of chloralkali plant effluents. The process comprised adding sodium hypochlorite to the mercury containing liquid, followed by a retention time of about 8-12 hours; then adding sodium borohydride to the liquid before contacting it with the entraining gas.

The mercury-containing aqueous medium was contacted with the estraining gas in counter current, in a turbulent contactor of the type taught in Canadian Pat. No. 740,853 (issued Aug. 16, 1966, to Dominion Tar and Chemical Co., assignee of H. R. Douglas) and known by the tradename "Turbulent Contact Absorber" (T.C.A.). A 3-stage T.C.A. with a 6 inch internal diameter, through which air heated by steam to about 55°–70° C., flowing at a rate of 2366–2602 l./m. was used for aeration of the sample and entrainment of the mercury. The liquid circulation rate through the contractor was 18–22 l./m. The stripping efficiency in this case is obtained from the percent differences of the mercury content between the untreated aqueous medium and the bleed-off stream from the line which recycles the aerated aqueous medium for additional passes through the contactor.

The aqueous medium employed in experimental runs 1 and 2 was taken from the cell sewer of a chloralkali plant and contained the water employed in washing the floor of the cellroom and has an undissolved solids content of 0.007%. These experiments demonstrate the difference in mercury removal between a prior art technique and the present technique when substantially all the mercury present in the aqueous medium is ionic and elemental mercury is substantially absent. The addition of 100 ppm. of sodium hypochlorite to the aqueous medium before the reduction step, in experiment 2 resulted in an increase of 10% in mercury removal over the previous run. The slightly higher amount of sodium borohydride employed in the second experiment is due to its partial consumption by the excess hypochlorite added in the previous step.

The samples for experiments 3 and 4 were taken from a chloralkali plant perimeter sewer; the contents of which originated in spills and run-off water. The total mercury in the sample for experiment 3 was 0.9 ppm. while the sample for experiment 4 contained 5 ppm. The higher mercury content in the latter sample was a result of the addition of ionic mercury in the form of mercuric chloride solution to the perimeter sewer sample. The lack of significant difference in mercury removal between experimental runs 3 and 4 suggests that increases in the ionic mercury content of the sample does not adversely affect the removal of mercury.

Experiment 5 deals with the removal of mercury from a sample of brine sludge from a chloralkali plant, using the process of the present invention.

The experimental conditions for the various runs are summarized in Table II below.

TABLE II

| Exp. Run Number | 1 | 2 | 3 | 4 | 5 |
| --- | --- | --- | --- | --- | --- |
| Total solids (%) | 0.007 | 0.007 | 0.028 | 0.028 | 0.48 |
| Sample Volume Treated (litres) | 40 | 40 | 60 | 40 | 40 |
| Hypochlorite dosage (as ppm $Cl_2$) | 0 | 100 | 700 | 850 | 780 |
| Sodium Borohydride dosage (ppm) | 35 | 50 | 200 | 250 | 250 |
| Stripping Time (min.) | 50 | 50 | 40 | 50 | 50 |
| Temp. of Stripping Gas (°C.) | 55–62 | 58–65 | 57–63 | 58–70 | 57–63 |
| Initial Mercury Concentration in untreated aqueous medium (ppm) | 4 | 4 | 0.9 | 5 | 0.65 |
| Residual Mercury Concentration in treated aqueous medium (ppm) | 1.4 | 1.0 | 0.054 | 0.1 | 0.026 |
| Stripping Efficiency (%) | 65 | 75 | 94 | 98 | 96 |

EXAMPLE III

This example illustrates the application of the present invention to a process for the continuous removal of mercury from aqueous media, characterized in that the residence time required for substantial mercury removal is greatly decreased as compared with the previous example.

The sample of experimental run number 1 comprised brine sludge diluted to a consistency (about 0.25% solids) similar to that of the combined effluents from a chloralkali plant. This dilution was carried out with a mercuric chloride solution in order to prevent the mercury concentration in the sample from falling below detectable levels because of this dilution. The diluted sludge sample was first treated with a sodium-hypochlorite solution and held for a period of 3–6 hours. Following this period of oxidation, sodium borohydride was added continuously to the oxidized sample before it entered the feed pump of the T.C.A. The reduced mercury in the sample was continuously stripped by means of an air stream, heated by steam in such a way that a gas temperature of about 60° C. was maintained. The stripping efficiency of this system was given by the percent decrease in mercury concentration and was obtained from the mercury concentrations in the feed stream, prior to its dilution by the recycle and in the bleed off stream.

The sample for experimental run 2 originated as caustic filter backwash sludge and was treated in a manner essentially identical to the previous sample.

The sample for experimental run 3 was a mixture of brine sludge, perimeter sewer sludge, caustic backwash sludge, bleed off from the acid sewer, cell sewer and spent brine of a chlor-alkali plant in quantities to duplicate the essential characteristics (e.g. consistency, chemical composition, etc.) of the combined effluent from a chloralkali plant. The procedure employed was essentially the same as in the previous experimental runs, with the only difference being the reducing agent, which in this case was a mixture of sodium sulfite and sodium borohydride.

The experimental conditions are summarized in Table III below:

TABLE III

| Experimental Run Number | 1 | 2 | 3 |
|---|---|---|---|
| Solids Content (%) | 0.25 | 0.25 | 0.30 |
| Sodium Hypochlorite Added (As ppm $Cl_2$) | 850 | 745 | 1200 |
| Sodium Sulfite dosage (ppm) | 0 | 0 | 2800 |
| Sodium Borohydride dosage (ppm) | 300 | 260 | 97 |
| Liquid feed Rate to T.C.A. $\frac{(litres)}{(min.)}$ | 2.1 | 2.0 | 3.79 |
| Circulation Rate in T.C.A. $\frac{(litres)}{(min.)}$ | 19 | 17 | 18.93 |
| Temp of Stripping Gas (°C.) | 60–62 | 57–58 | 64.5 |
| Stripping Time (min.)* | 1–2 | 1–2 | 1–2 |
| Initial Mercury Conc. (ppm) | 4.72 | 1.74 | 35 |
| Residual Mercury Conc. (ppm) | 0.15 | 0.115 | 2.4 |
| Stripping Efficiency (%) | 96.8 | 93.4 | 93 |

*Average residence time of the liquid in the tower, based on residence times in each stage.

Modifications to the above will be evident to those skilled in the art, without departing from the spirit of the invention as defined in appended claims.

I claim:

1. A process for the removal and recovery of mercury from an aqueous medium containing solids having mercury associated therewith, substantially all of said mercury being in the form of inorganic ionic mercury, comprising the steps of: treating said medium with hypochlorite in a molar amount comprising at least 20 times the molar amount of said mercury in said medium thereby to dissociate said ionic mercury from said solids, adding a reducing agent to said hypochlorite treated medium to ensure conversion of substantially all said ionic mercury in said medium to elemental mercury, passing an entraining gas through said medium to entrain said elemental mercury, separating said entrained mercury from said gas thereby to recover said mercury.

2. A process as described in claim 1 wherein said aqueous medium comprises aqueous effluent from a chloralkali plant having electrolysis cells with mercury cathodes.

3. A process as described in claim 1 wherein said reducing agent contains at least one member of the group comprising sodium borohydride and sodium sulfite.

4. A process as described in claim 1 wherein said entraining gas is air at a temperature of at least 30° C.

5. A process as described in claim 2 wherein said vaporized mercury is separated from said gas by stripping said mercury from said gas with chloride-containing brine.

6. A process as described in claim 5 where at least a portion of said chlorine-containing brine containing said stripped mercury is returned to said electrolysis cells in said chlor-alkali plant.

7. A process as described in claim 1 where said vaporized mercury is separated from said gas by passing it through an absorber.

* * * * *